US012057028B2

(12) United States Patent
Tucci

(10) Patent No.: US 12,057,028 B2
(45) Date of Patent: Aug. 6, 2024

(54) SYSTEM FOR TRACKING AND DISPLAYING THE POSITION OF A MOTOR VEHICLE AND OF A USER

(71) Applicant: Federico Tucci, Lamporecchio (IT)

(72) Inventor: Federico Tucci, Lamporecchio (IT)

( * ) Notice: Subject to any disclaimer, the term of this patent is extended or adjusted under 35 U.S.C. 154(b) by 29 days.

(21) Appl. No.: 18/011,776

(22) PCT Filed: Jun. 23, 2021

(86) PCT No.: PCT/IB2021/055526
§ 371 (c)(1),
(2) Date: Dec. 20, 2022

(87) PCT Pub. No.: WO2022/003492
PCT Pub. Date: Jan. 6, 2022

(65) Prior Publication Data
US 2023/0230503 A1     Jul. 20, 2023

(30) Foreign Application Priority Data

Jun. 30, 2020   (IT) .................. 102020000015736

(51) Int. Cl.
*G09B 19/16*     (2006.01)
(52) U.S. Cl.
CPC ................ *G09B 19/167* (2013.01)
(58) Field of Classification Search
CPC ... G09B 19/167; G09B 19/0038; G09B 9/058
See application file for complete search history.

(56) References Cited

U.S. PATENT DOCUMENTS

| | | | |
|---|---|---|---|
| 2015/0127239 A1 | 5/2015 | Breed et al. | |
| 2015/0317834 A1 | 11/2015 | Poulos et al. | |
| 2020/0128902 A1* | 4/2020 | Brown | A42B 3/042 |
| 2021/0133447 A1* | 5/2021 | Babu | G02B 27/0093 |
| 2021/0269114 A1* | 9/2021 | Suzuki | G02B 27/0101 |

FOREIGN PATENT DOCUMENTS

WO      2017013570 A1      1/2017

OTHER PUBLICATIONS

Italian Search Report dated Mar. 1, 2021 from counterpart Italian Patent Application No. IT 102020000015736.
International Search Report and Written Opinion dated Aug. 4, 2021 from counterpart International Patent Application No. PCT/IB2021/055526.

* cited by examiner

*Primary Examiner* — An T Nguyen
(74) *Attorney, Agent, or Firm* — SHUTTLEWORTH & INGERSOLL, PLC; Timothy J. Klima

(57) ABSTRACT

Described is a system for tracking and displaying the position of a motor vehicle driven by a user with respect to a determined route and the position of said user with respect to said motor vehicle.
The system includes a first and a second data acquisition unit configured to instantaneously detect the position of the motor vehicle and of the user relative to the motor vehicle and to the determined route; a processing unit for generating an image of the position of the motor vehicle and of the user and a visual projection device.

10 Claims, 6 Drawing Sheets

SYSTEM FOR TRACKING AND DISPLAYING THE POSITION OF A MOTOR VEHICLE AND OF A USER

This application is the National Phase of International Application PCT/IB2021/055526 filed Jun. 23, 2021 which designated the U.S.

This application claims priority to Italian Patent Application No. 102020000015736 filed Jun. 30, 2020, which applications are incorporated by reference herein.

TECHNICAL FIELD

This invention relates to a system for tracking and displaying the position of a motor vehicle and of a user.

The system according to the invention is especially suitable for use during training sessions on a sports circuit.

More specifically, the system according to the invention allows the user to display information in real time on the sports performance thanks to the projection, moment by moment, of an image of the motor vehicle in the performance of a previous pre-selected lap or a reference lap also not previously performed by the user.

Moreover, as well as the image of the motor vehicle, it is also possible to display in real time the position of the driver.

BACKGROUND ART

There are currently prior art systems which are able to record data on the performance of a vehicle, for example in terms of average speed, consumption, atmospheric conditions or racing line followed.

These prior art systems, although useful for the tracking and analysing the performance of a driver, do not allow an exact study of the performance.

An exact study of the performance means the possibility of analysing key values for determining the quality of the performance at every point of the track.

For example, in order to carry out an exact study, by means of a telemetry acquisition device, it is necessary to measure the key values at predetermined time intervals, approximately in the order of seconds or in any case according to the thoroughness of the analysis to be performed.

The aggregated parameters currently available, such as, for example, average speed, do not allow an in-depth understanding of the performance and the areas which require improvement by the driver.

Systems for the immediate study and analysis of the performance are currently only possible in situations and environments equipped for the purpose, for example with video cameras positioned at points of interest.

Solutions of this type, even though able to record the key values at the points where the video cameras are installed, make the system extremely complex.

This complexity is due, for example, to the need to have a large number of video cameras.

Moreover, this type of solution does not allow the key values to be recorded on the performance of a driver outside environments equipped for the purpose.

On the other hand, an immediate and continuous monitoring of the performance of a driver during his/her training may be of assistance, in order to correct any errors, such as, for example, incorrect driving positions as well as, obviously, non-ideal trajectories.

Not having an immediate analysis during each training session may in fact be harmful for improving the performance of the driver.

Moreover, the currently known systems do not allow the driver to analyse his/her performance in real time and in particular with reference to a chosen lap.

In fact, the performance, for example captured by the video cameras, is normally recorded and stored for an analysis which occurs only after the performance itself.

In these situations, the driver does not have an immediate check on the errors or improvements which he/she can make to his/her driving.

Not being able to detect in real time an error prevents the driver from being able to correct it on the time, slowing down his/her learning process.

Patent document US 2015/127239 A1 describes a system of known type for mapping the terrain, wherein the position of a vehicle is tracked relative to a predetermined route for recalibrating sensors of an inertial unit (IMU) by using video cameras.

DISCLOSURE OF THE INVENTION

A first aim of this invention is therefore to provide a system for tracking and displaying the position of a motor vehicle and of a user for monitoring his/her training in an easy, instantaneous manner and in real time.

Moreover, the aim of the invention is to favour the constant improvement of the performance of a driver during training sessions.

A further aim is to provide a device which is able to keep the attention of the user at high levels, without the user having to look away from the track during driving of the motor vehicle.

A further aim is to provide a system which is simple and inexpensive to make and practical to use.

The above aims are achieved by a system for tracking and displaying the position of a motor vehicle and of a user comprising the technical features described in one or more of the accompanying claims.

Further features and advantages of the invention are more apparent in the non-limiting description which follows of preferred embodiments of a system for tracking and displaying the position of a motor vehicle and of a user.

BRIEF DESCRIPTION OF THE DRAWINGS

The description is set out below with reference to the accompanying drawings which are provided solely for purposes of illustration without restricting the scope of the invention and in which.

DETAILED DESCRIPTION OF PREFERRED EMBODIMENTS OF THE INVENTION

The numeral 1 generically indicates in its entirety a system for tracking and displaying the position of a motor vehicle 9 driven by a user with respect to a determine route and the position of the user with respect to the motor vehicle 9 according to the invention.

The system is hereinafter referred to simply as the system 1.

Hereinafter, where not clearly specified, the term "data" must be understood to generically mean both data and images.

Figure 1:
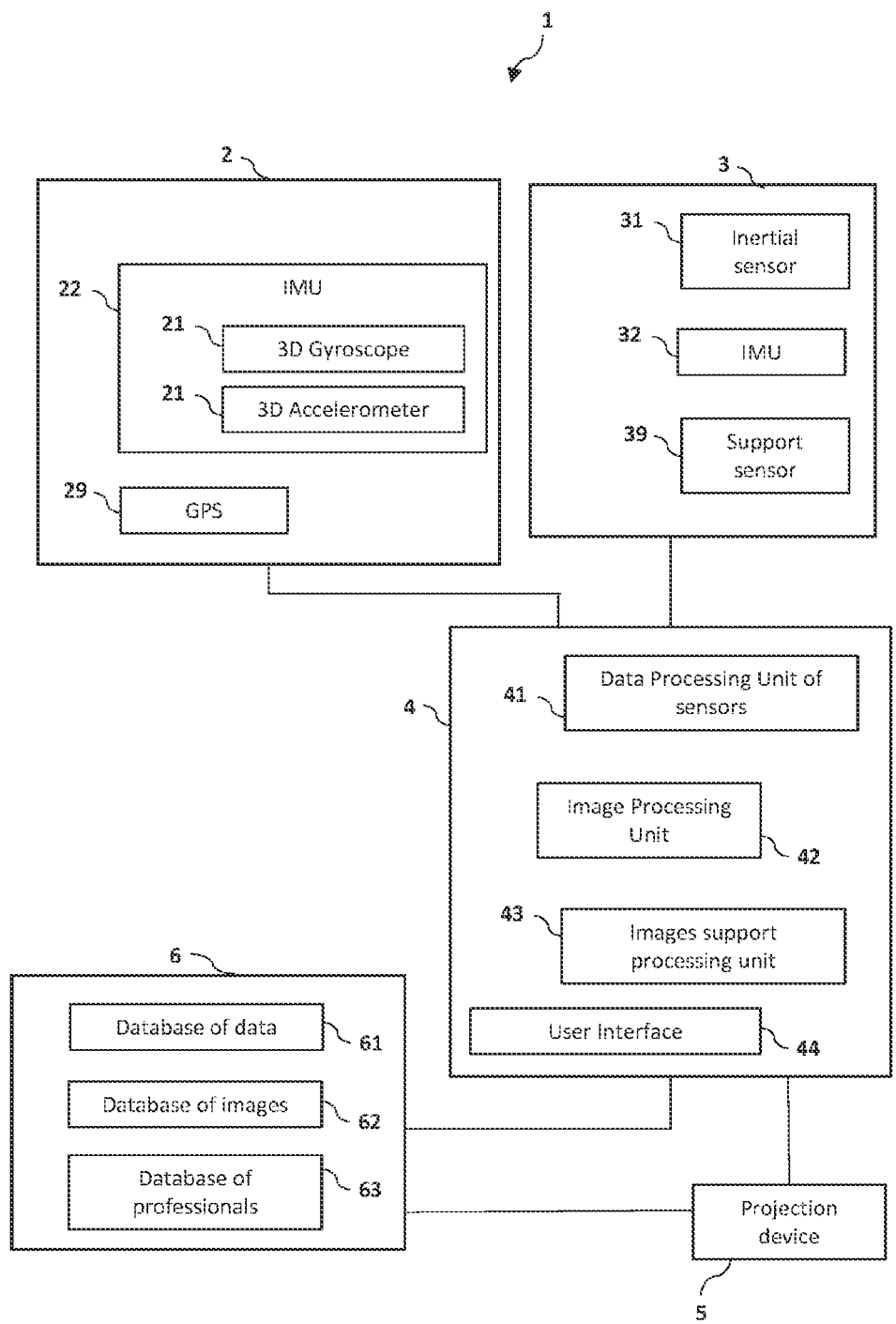
FIG. 1 shows a schematic representation of the system for tracking and displaying the position of a motor vehicle and of a user, and its main components according to the invention.

With reference to FIG. 1, the system 1 comprises: a first data acquisition unit 2 and a second data acquisition unit 3, a processing unit 4 and a visual projection device 5.

The first data acquisition unit 2 is positioned on the motor vehicle 9 and is configured to instantaneously detect the position of the motor vehicle 9 with respect to a determined route.

The term "determined route" is used to mean a route selected by the user.

This route represents, for example, a particular sports circuit which the user is about to travel along.

The second data acquisition unit 3 is integral with the user and is configured to instantaneously detect the position of the user with respect to the motor vehicle 9 and, therefore, with respect to the determined route.

The system 1 according to the invention does not use video cameras.

The system 1 is based on motion capture technologies which are of the inertial type.

The expression motion capture technology means the reproduction of an image of a user and its movements recreated with software systems.

The motion capture systems of the inertial type, such as those used for the invention, do not use video cameras for detecting the position of the user and the motor vehicle 9, making use mainly of inertial type sensors 21 and 31.

The first 2 and the second 3 data acquisition units comprise inertial sensors 21 and 31.

The term inertial sensors 21 and 31 means sensors sensitive to movement, from which it is possible to extract, if necessary by processing the data, the instantaneous position of a body in space.

For the purposes of the invention, the inertial sensors 21, 31 comprise gyroscopes and accelerometers.

Both the accelerometers and gyroscopes shall be considered as one-dimensional unless otherwise indicated.

For example, both the accelerometers and gyroscopes are to be considered as three-dimensional where they are referred to respectively as 3D accelerometers and 3D gyroscopes.

Three one-dimensional accelerometers arranged according to directions at right angles to each other shall be considered equivalent, for the purposes of determining the position, to a 3D accelerometer.

Similarly, three one-dimensional gyroscopes positioned according to directions at right angles to each other hall be considered equivalent, for determining the position, to a 3D gyroscope.

According to the invention the accelerometers are of the mechanical type, MEMS (Micro Electro Mechanical Systems) or of another type, provided that they are aimed at the measurement of the acceleration of a body.

According to invention, gyroscopes are of the optical type, for example laser gyroscopes (RLG) or optical fibre gyroscopes (FOG), or of another type such as MEMS gyroscopes and vibration gyroscopes.

According to alternative embodiments not illustrated, in addition to the above-mentioned inertial sensors 21 and 31, the system comprises other types of sensors, referred to as support sensors 29 and 39, which are useful for detecting the position under certain conditions, such as, for example, in situations of emergency or reduced coverage of the signal for connection to the server.

The first 2 and the second 3 data acquisition units comprise at least one support sensor 29 and/or 39 selected from GPS, magnetometer, odometer, gyrometer, laser interferometer, thermometer, barometer or a combination of them.

For example, the GPS sensor is advantageously used to determine the initial reference position.

The magnetometer is advantageously used for detecting disturbances due to magnetic fields which may adversely affect, for example, the operation of the inertial sensors 21 and 31.

The magnetic sensors are also advantageously used for detecting vibrations.

A 3D gyroscope and a 3D accelerometer in their entirety define an inertial measurement unit (IMU) for detecting the motion of a body.

Alternatively, the 3D gyroscope and the 3D accelerometer may be replaced, respectively, by 3 one-way gyroscopes and 3 unidirectional accelerometers operatively connected to each other.

The first 2 and the second 3 data acquisition units comprise a respective inertial measurement unit (IMU) 22 and 32.

To correctly start an IMU, that is to say, allow the correct positioning of the body in space, the use of a GPS sensor, or a different form of a satellite navigation system, is advantageous.

Figure 6:
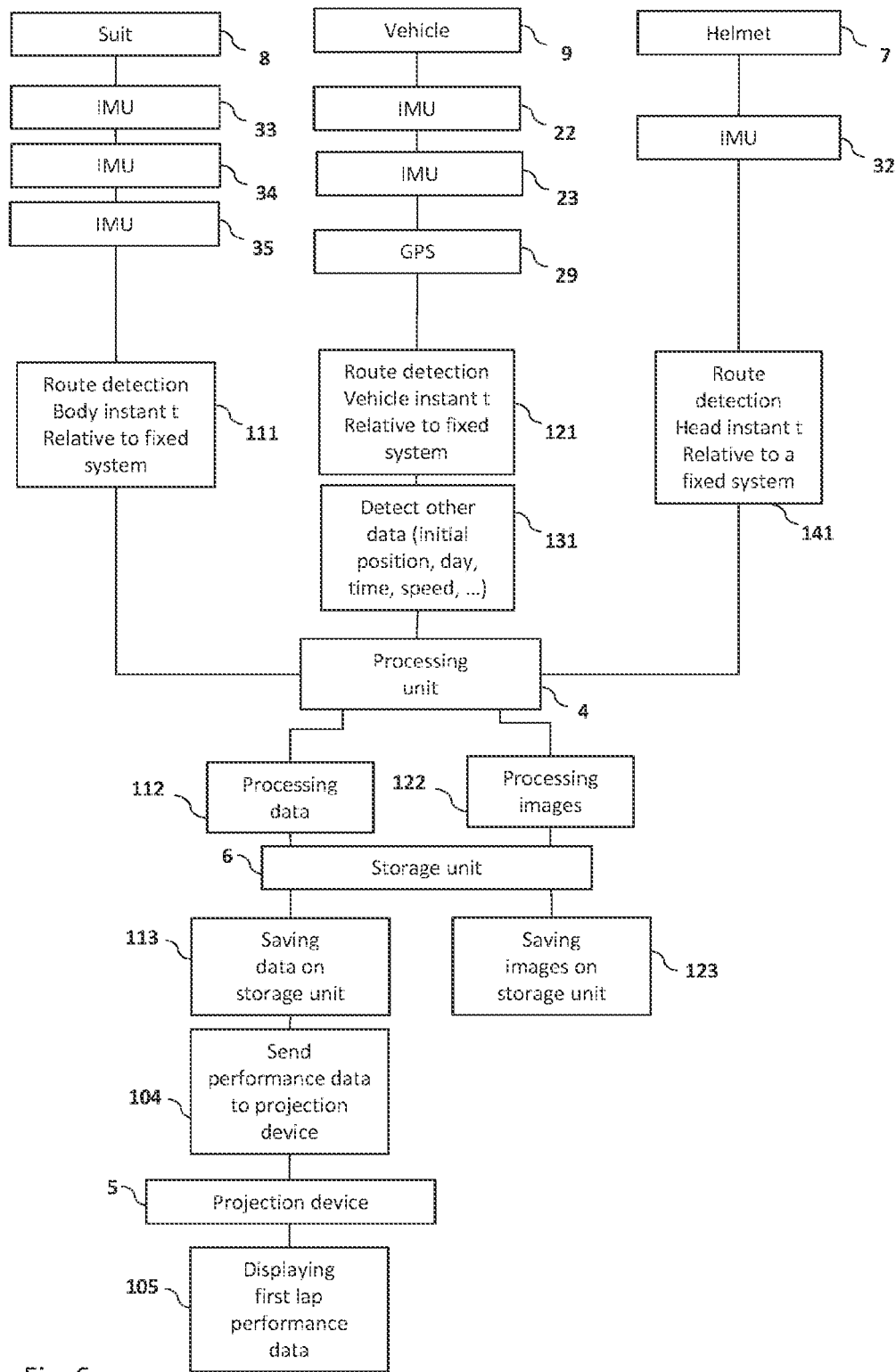
FIG. 6 shows a schematic representation of the process of FIG. 4 highlighting the interaction with the various elements of the system for tracking and displaying the position of a motor vehicle and of a user of FIG. 1.

With reference to FIG. 6, a support sensor 29 in the form of a GPS allows the initial reference position to be determined.

The initial reference position makes it possible to position the motor vehicle 9 and the user correctly on the ground.

After determining the initial reference position, the IMU does not need external references to determine moment by moment its position, orientation or speed.

In alternative embodiments not illustrated, which, for example, comprise the use of optical gyroscopes, the integration with satellite systems such as GPS is not necessary since the optical gyroscopes are able to determine independently the initial reference position.

In other embodiments not illustrated, the system 1 comprises a satellite navigation system configured to perform the correction of any drift errors of the IMUs 22 and 32.

Advantageously, all the sensors used in the system 1 according to the invention are of the wireless type.

In embodiments not illustrated, the sensors are wired, integrating in the body of the motor vehicle 9, or in the clothing of the driver, the data processing unit 4.

In these embodiments, the sensors are integrated in the clothing of the driver, such as, for example, in the suit 8, in the helmet 7 and in the body of the motor vehicle 9.

In these embodiments, the quality of the data and their correct processing is also determined by the quality of the wiring of the sensors and by the quality of the signal.

In embodiments not illustrated, the sensors are, on the other hand, positioned on the surface of clothing of the driver, such as, for example, of the suit 8, helmet 7 or the body of the motor vehicle 8.

For example, fixed or removable anchoring elements, such as magnets or adhesive strips, not illustrated, are associated with the sensors.

The system 1 comprises various types of configurations defined depending on the position and the type of sensors used.

Some examples are given below purely by way of example.

Figure 2:
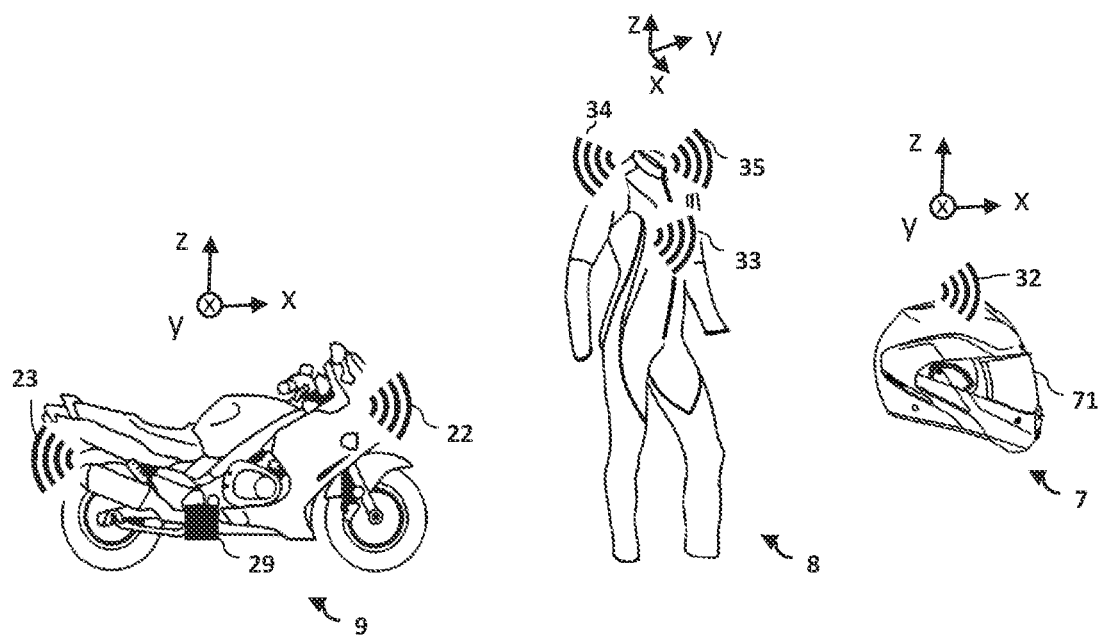
FIG. 2 shows a schematic representation of the position of sensors and inertial measurement units according to the invention in a first configuration of use.
Figure 3:
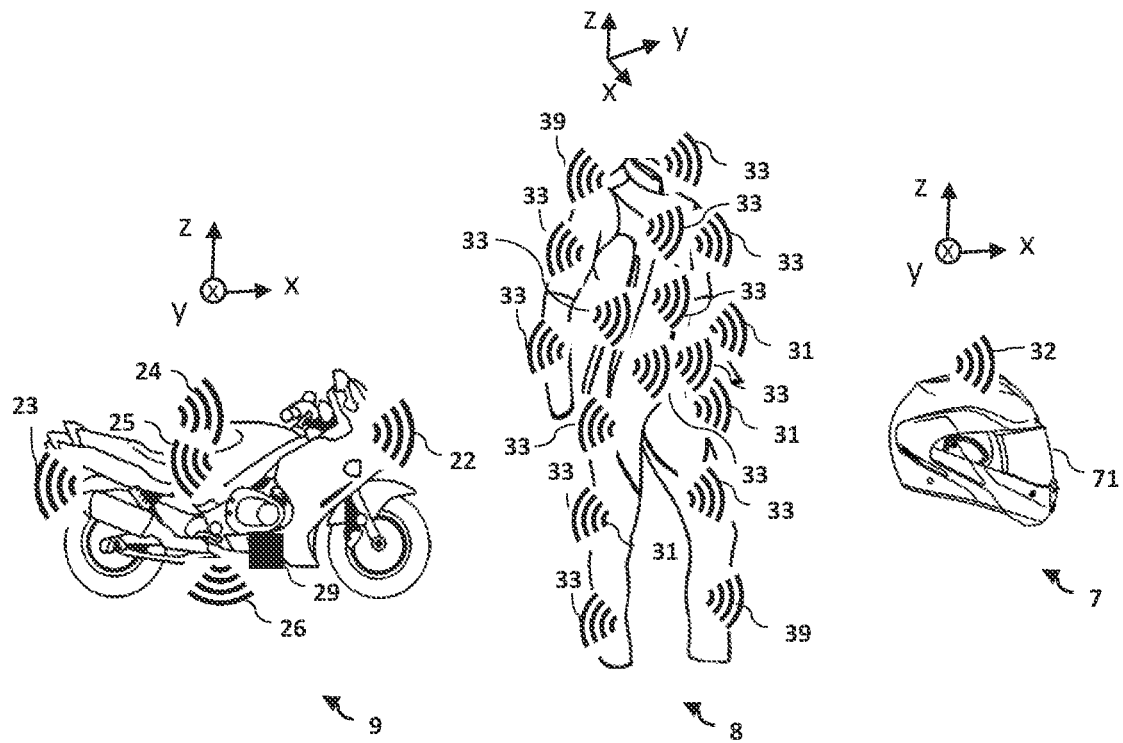
FIG. 3 shows a schematic representation of the position of sensors and inertial measurement units according to the invention in a second configuration of use.

FIGS. 2 and 3 show two different configurations for positioning IMUs 22 and 32 and others.

According to the configuration of use shown in FIG. 2, the first data acquisition unit 2 positioned on the motor vehicle 9 comprises a first IMU 22 designed to be positioned at a front portion of the motor vehicle 9 and a second IMU 23 designed to be positioned at a rear portion of the motor vehicle 9.

According to the configuration of use shown in FIG. 3, the first data acquisition unit 2 positioned on the motor vehicle comprises, in addition to a first IMU 22 designed to be positioned at a front portion of the motor vehicle 9 and a second IMU 23 designed to be positioned at a rear portion of the motor vehicle 9, a third and a fourth IMU, respectively denoted by the reference numerals 24 and 25, designed to be positioned, respectively, on a right-hand portion and a left-hand portion of the motor vehicle 9 and a fifth IMU 26 designed to be positioned on a rear portion of the motor vehicle 9.

In embodiments not illustrated, further sensors are positioned on the wheels of the motor vehicle 9 for measuring the spin of the wheels.

The system 1 according to the invention also comprises the use of data acquisition units 3 on the user, that is to say, on the driver.

In order to detail the position adopted by the user (relative to both the motor vehicle 9 and the determined route), the data acquisition unit 3 comprises the detection of both the position of the user's body and his/her head.

In fact, the head can rotate at least partly relative to the user's body.

In an embodiment not illustrated, the system 1 advantageously comprises an IMU 22 positioned on the motor vehicle 9 and an IMU 32 positioned on the helmet 7 of the user.

With reference to FIGS. 2 and 3, the second data acquisition unit 3 comprises an IMU 32 configured to be fixed as one with the helmet 7 of the user and is configured to generate an image I' of the position of the helmet 7 worn by the user.

The second data acquisition unit 3 also comprises at least one IMU 33 designed to be fixed to the suit 8 of the user, and is configured to generate an image I" of the position of the suit 8 worn by the user.

With reference to FIG. 2, three different IMUs 33, 34, 35 are installed on the suit 8.

Advantageously, the IMUs 34 and 35 are positioned at the height of the shoulders and the IMU 33 at the height of the chest of the user.

In a second use configuration, illustrated in FIG. 3, a plurality of IMUs 33, inertial sensors 31 and support sensors 39 are installed on the suit 8.

In this second configuration the suit 8 allows precise determination of the position of the user's body and of its parts.

FIG. 1 shows the use of two IMUs: an IMU 22 positioned on the motor vehicle 22 and an IMU 32 positioned on the user's helmet 7.

A GPS positioned on the motor vehicle 9 and a further support sensor 39 and an inertial sensor 31 positioned on the user's body.

The processing unit 4 is designed to generate an image I of the position of the motor vehicle 9 and the position of the user.

More specifically, the processing unit 4 comprises a data processing unit 41 for processing data coming from the data acquisition units 2 and 3 and/or from the various support sensors 29 or 39 used.

The processing unit 4 also comprises an image processing unit 42 for creating and processing images I of the motor vehicle and of the user.

These images I are formed using the data coming from the data acquisition units 2 and 3 and/or from the support sensors 29 and 39 used by the system 1, as well as from the results processed by the data processing unit 41.

Both the data processing unit 41 and the image processing unit 42 are equipped with devices for storing data and images.

These data storage devices, even though with reduced storage capacity, allow the use of the system 1 completely independently.

With reference to FIG. 1, the system uses a data storage unit 6, described in more detail below.

The data storage unit 6 supports the activity of the processing unit 4.

The processing unit 4 comprises a support unit 43 for processing the images.

The support processing unit 43 is used in the processing of the images so as to vary them on the basis of the curvature of the visor 71 of the helmet 7 in such a way that these are not distorted by the curvature.

In some alternative embodiments, not illustrated, the support processing unit 43 is integrated in the projector of the projection device 5, rather than in the processing unit 4.

In embodiments not illustrated, the support processing unit 43 comprises a software system to compensate for the movements of the head of the user, in such a way as to leave the image I displayed in the correct position.

In this way, the image I is easily understood by the user whatever the position of his/her head.

More specifically, the reference plane on which the image I moves is always horizontal relative to the ground regardless of the inclination of the head of the user during the performance.

The system 1 according to the invention also comprises user interfaces 44 which make it possible to display the data processed by the system 1 and to set the system 1 in a selected manner.

The user interfaces 44 allow, for example, data to be viewed, such as the time taken to perform a determined route (advantageously an entire lap), the display of lap times of a determined route, indicators which show the improvement or worsening of the performance compared, for example, to a previous lap.

The user interfaces 44 are also associated with functions for selecting sample images of the driver, the motor vehicle and their textures, in such a way as to make the projected image I more realistic.

In embodiments not illustrated, the user interfaces 44 are made in units distinct from the data processing unit 4.

According to embodiments not illustrated, the system 1 according to the invention is associated with touch or voice tools.

The term "touch tools" means a tool activated by the touch of the user.

The touch tools are advantageously positioned at the steering wheel of the motor vehicle so that they can be easily operated by the user.

Similarly, the term "voice tools" is used to mean tools activated by the user's voice.

Moreover, in embodiments not illustrated, the system 1 has further commands positioned on the steering wheel of the motor vehicle for controlling one or more functions of the system.

These functions may, for example, be the switching on or off of the tracking system, starting the recording of the performance and, if necessary, saving it, adjusting the luminosity of the projected image I, adjusting other parameters for displaying the image I in order to improve the legibility under various luminosity conditions, adjusting the volume of a voice interface associated with the system, resetting the system 1 or other similar functions supporting a comfortable experience of the user during use of the system 1 according to the invention.

The visual projection device 5 is connected to the processing unit 4 and is designed to be positioned inside a helmet 7 for protection of the user.

The visual projection device 5 is also connected to the storage unit 6 for acquiring data and images necessary for the projection.

The visual projection device 5 is designed to be positioned stably inside a protective helmet 7.

The visual projection device 5, in embodiments not illustrated, is of the "head-up" type, also known as HUD.

The HUD comprises a projection unit comprising a collimator.

The collimator comprises, for example, a lens or a mirror, and a liquid crystal, holographic or other type of display.

The HUD also comprises a controller, that is to say, an element for dividing the light beam, such as, for example, a flat glass.

The controller is located in front of the display which redirects the image projected by the projection unit in such a way that the user can simultaneously see the field of vision and the image I projected.

In embodiments not illustrated, the controller is replaced by the visor 71 of the helmet 7.

In embodiments not illustrated, the HUD comprises a computer which provides the interface between the projection unit and the data and the images I to be displayed.

The computer of the HUD is inserted inside the processing unit 4.

In further embodiments, the computer of the HUD is inserted inside the display device 5.

The visual projection device 5 is configured to project on a visor 71 of the helmet 7 the image I generated by the processing unit 4.

Figure 8:
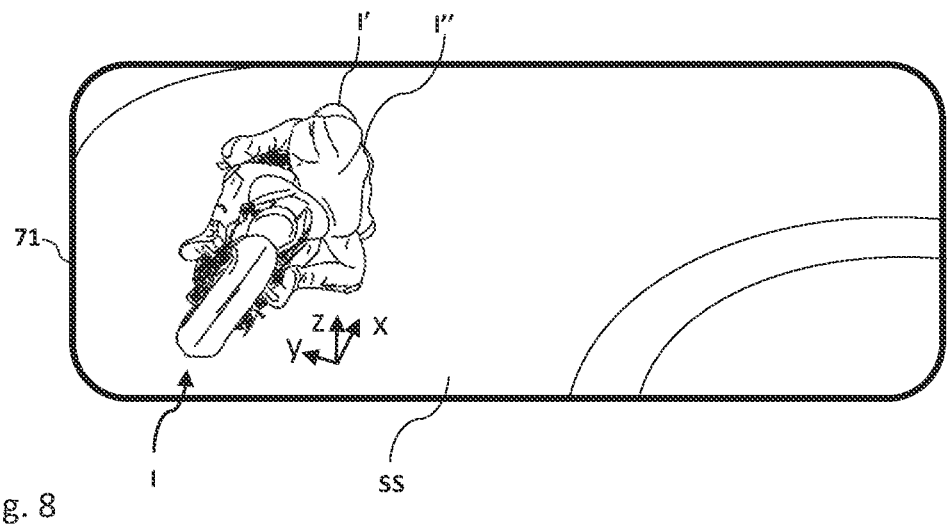
FIG. 8 shows a schematic representation of what a user views on the visor of his/her helmet during a use of the system for tracking and displaying the position of a motor vehicle and of a user of FIG. 1.
Figure 9:
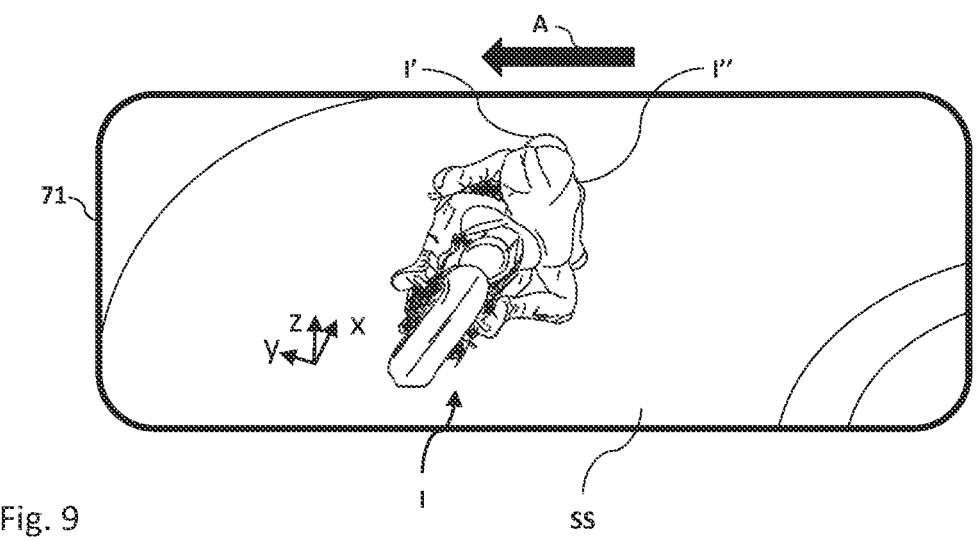
FIG. 9 shows a schematic representation of the situation of FIG. 8 in a different configuration of use.
Figure 10:
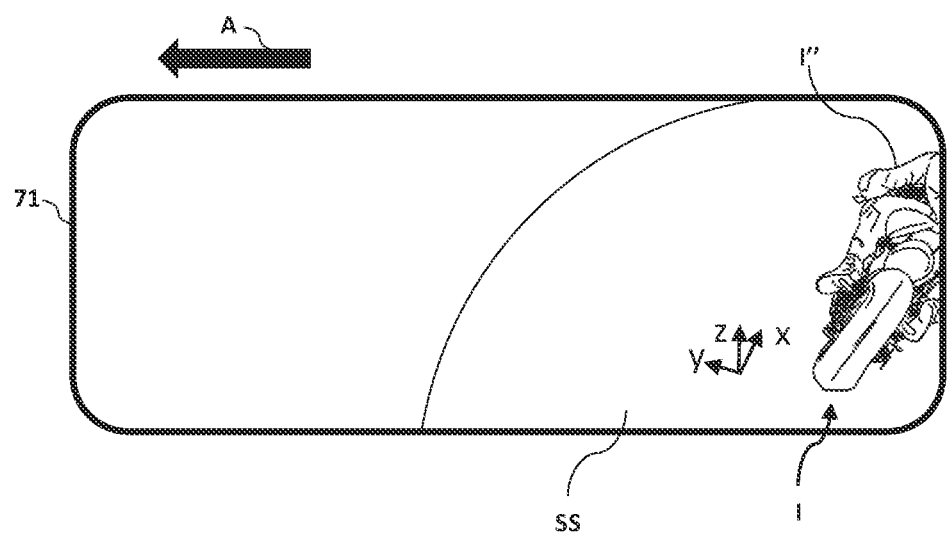
FIG. 10 shows a schematic representation of the situation of FIG. 8 in a further different configuration of use.

The visual projection device 5 is also configured to project the image I over the entire area of a visor 71 of the helmet 7, as illustrated in FIGS. 8 to 10.

The image I, displayed by the user, is projected in such a way that it is superposed on the actual road surface SS of the determined route, as illustrated in FIGS. 8 to 9.

More specifically, the image I is such as to instantaneously represent the actual positions of the motor vehicle 9 and of the user adopted in a previous passage along the same determined stretch of route.

The position adopted by the user is identified as the position adopted by the helmet 7 and by the suit 8 worn by the user.

An image I' is associated with the helmet 7 and an image I" is associated with the suit 8.

The image I' and the image I", together with the image of the motor vehicle, define the image I generated by the system 1.

The image I is also such as to be displayed on the visual projection device 5 when required.

The system 1 also comprises a unit 6 for storing the instantaneous image I generated by the processing unit 4 and the performance data.

The storage unit 6 can retrieve and make available the image I to the processing unit 4 and/or to the displaying device 5 for subsequent uses as required.

Advantageously, the storage unit 6 comprises one or more servers containing one or more databases for saving and storing data about the performance and images I of one or more routes performed by the user.

With reference to FIG. 1, the storage unit 6 comprises a database 61 of data, a database 62 of images and a database 63 of professionals.

The stored data on the performance are, for example, the measurements detected by the sensors, the data and the images processed by the processing unit 4, the standard data such as, for example, the performance of a professional driver or the performance relative to a previous lap performed by the same user.

The data as detected by the data acquisition units 2 and 3 and the data processed by the data processing unit 41 are stored in the database 61 of data.

The images as detected by the data acquisition units 2 and 3 and the images processed by the image processing unit 42 are stored in the database 62 of images.

The images and data relative to the performance of professional drivers are stored in the database 63 of professionals.

By means of the database 63 of professionals it is possible to retrieve the images I and the data on the performance of a professional driver selected by the user of the system 1 for the determined route.

The system 1 enables the performance data to be saved and to retrieve the data as necessary.

For example, the data saved may be retrieved to compare two different performance levels, such as, for example, the performances of one or more previous laps.

The system 1 according to the invention is also able to process the average values of the previous performances, generating a "false" performance (ideal lap) obtained from the average values of these performance levels.

Figure 4:
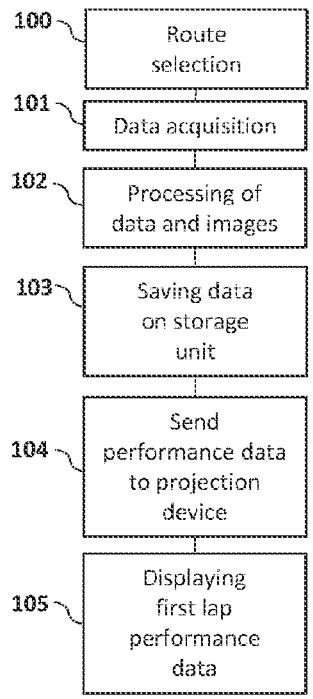
FIG. 4 shows a schematic representation of the various steps of the system of FIG. 1 during its first use.
Figure 7:
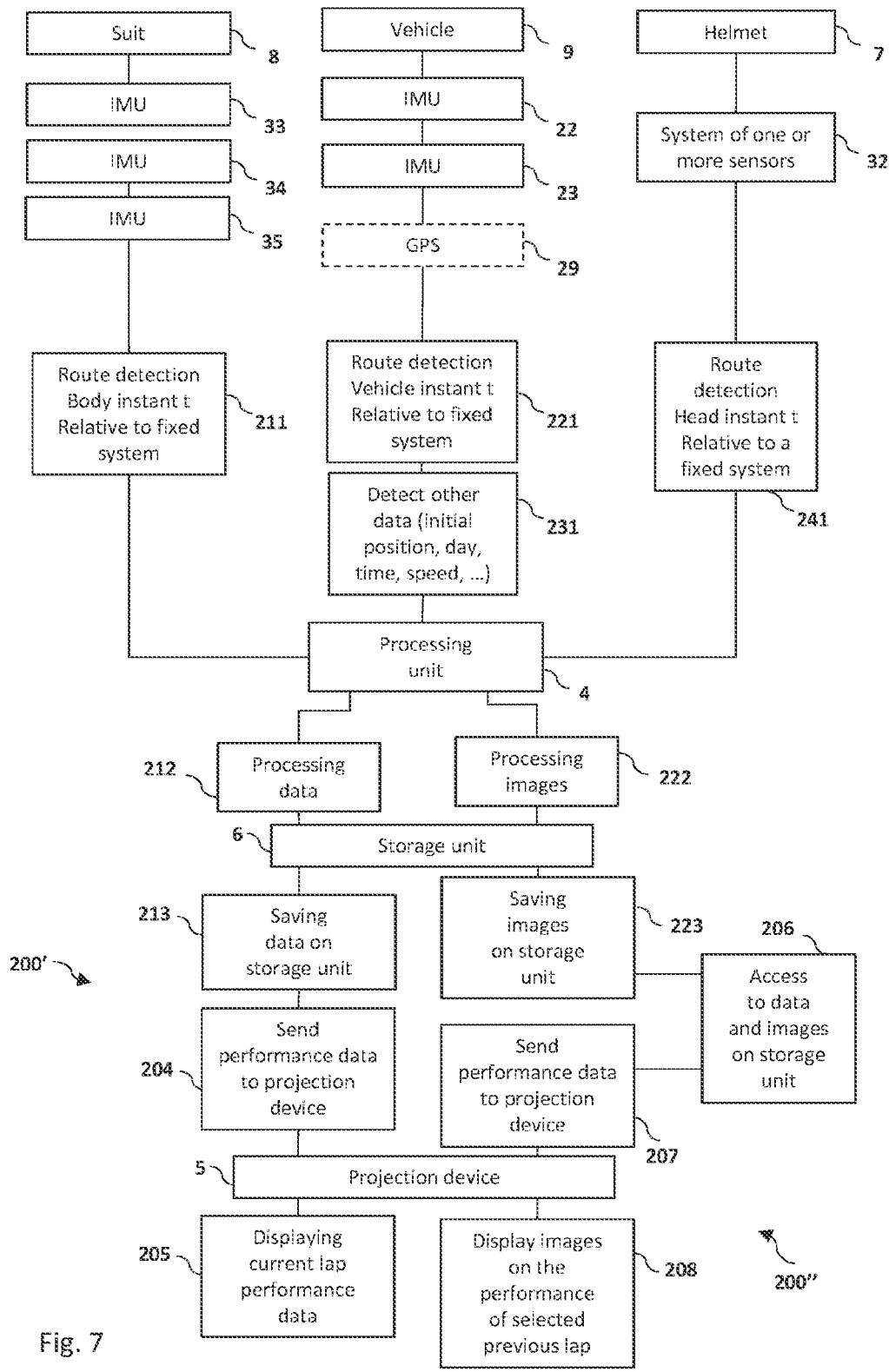
FIG. 7 shows a schematic representation of the process of FIG. 5 highlighting the interaction with the various elements of the system for tracking and displaying the position of a motor vehicle and of a user of FIG. 1.

FIGS. 4 and 7 illustrate the steps of the process during the first use of the system 1 according to the invention and its uses after the first use.

FIGS. 4 to 7 refer, by way of example, to the configuration of support sensors and IMUs of FIG. 2.

More specifically, FIGS. 4 and 6 illustrate the steps of the process during the first use of the system 1 according to the invention.

In use, during the first start, in step 100, the user selects a circuit, constituting the determined route to which the system 1 refers.

The user wears the suit 8 and the helmet 7 on which the data acquisition unit 3 is positioned, relative to the selected configuration, for detecting the position of the body and of the head of the user.

Similarly, the data acquisition unit 2, relative to the selected configuration, is positioned on the motor vehicle 9 for detecting the position of the motor vehicle 9.

After that, the user can start to travel along the determined route.

Whilst the user moves on the track, that is to say, in step 101, the data acquisition units 2 and 3 acquire the data coming from the IMUs 22, 23, 32, 33, 34 and 35, and from the support sensor 29 and send them to the processing unit 4.

In particular, the IMUs 33, 34 and 35 arranged on the suit 8 of the user acquire the data which allow the processing unit 4 to determine the position of the body of the user at the instant t relative to the fixed system, as shown in step 111.

The instant t means the instant at which the detection by the data acquisition units 2 and 3 is carried out.

The term "fixed system" is used to mean the ground.

The IMU 32 arranged on the helmet 7 of the user acquires the data which allows the processing unit 4 to determine the position of the head of the user at the instant t with respect to the fixed system, as shown in step 141.

The IMUs 22 and 23 arranged on the motor vehicle 9 acquire the data which allow the processing unit 4 to determine the position of the motor vehicle 9 at the instant t with respect to the fixed system, as shown in step 121.

Moreover, the support sensor 29, that is, a GPS, makes it possible to determine the exact initial position of the user on the ground, as shown in step 131.

Subsequently, in the step 102, the data acquired by the data acquisition units 2 and 3 is processed by the processing unit 4.

The processing unit 4 determines the relative positions between the driver, the motor vehicle 9 and the fixed system (position on the ground), as shown in step 112.

Subsequently, in the step 122, the processing unit 4 creates the images I relative to the positions calculated.

In the subsequent step 103 the data and the images processed by the processing unit 4 are stored on the storage unit 6, to be retrieved subsequently, as shown in the respective steps 113 and 123.

Subsequently, in the step 104, the data on the performance of the user in the current lap are sent to the projection device 5.

In this way, the user can view, phase 105, the data such as, for example, day, time, speed at instant t, humidity and the temperature relative to the route he/she is travelling along.

During the first start, the user views only the data on his/her performance.

Without having the first start of images I, the user can select a performance relating to a professional driver stored on the storage unit 6.

Figure 5:
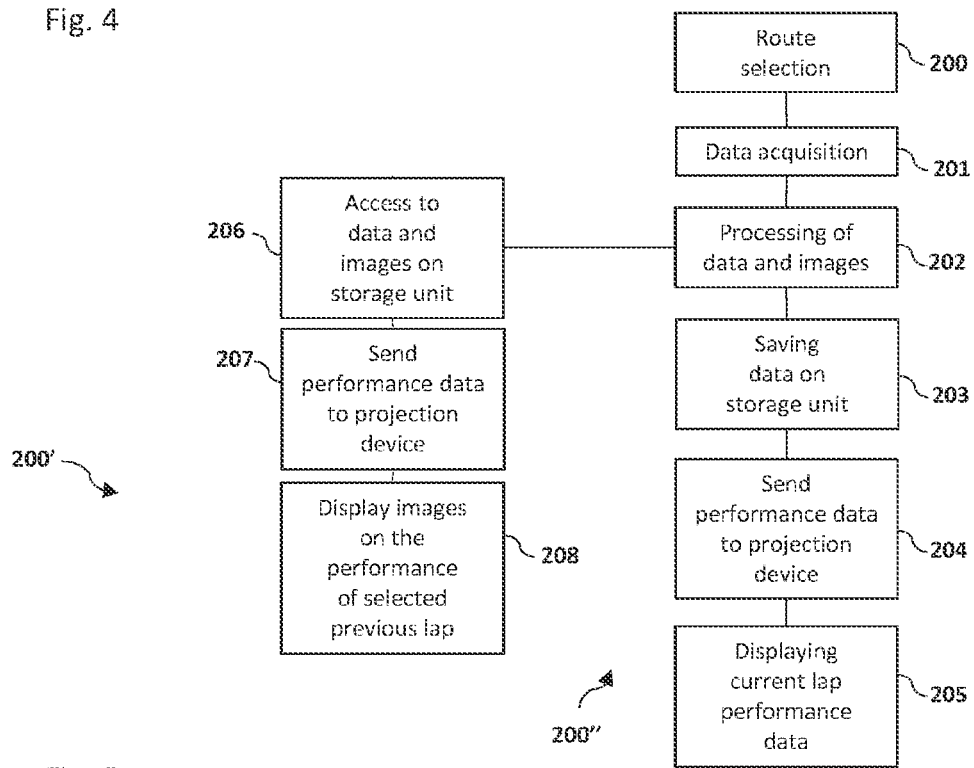
FIG. 5 shows a schematic representation of the various steps of the system of FIG. 1 during a use after its first use.

In this situation and in the laps after the first lap on the determined route the system 1 follows the steps of FIGS. 5 and 7.

FIGS. 5 and 7 illustrate the steps of the process during a use of the system 1 after the first use.

In step 200, the user selects a determined route.

The user wears the suit 8 and the helmet 7 on which the data acquisition unit 3 is arranged, and uses the motor vehicle on which the data acquisition unit 2 is arranged.

After that, the user can start to travel along the determined route.

Or, vice versa, the user performs a new lap on the same determined route.

Whilst the user moves on the track, that is to say, in step 201, the data acquisition units 2 and 3 acquire the data coming from the various sensors and from the IMUs arranged on the suit, on the helmet and on the motor vehicle and send them to the processing unit 4.

This data relates to the performance at that precise instant.

In particular, the IMUs 33, 34 and 35 arranged on the suit 8 of the user, as mentioned above, acquire the data which allow the processing unit 4 to determine the position of the body of the user at the instant t with respect to the fixed system, as shown in step 211.

The IMU 32 arranged on the helmet 7 of the user acquires the data which allows the processing unit 4 to determine the position of the head of the user at the instant t with respect to the fixed system, as shown in step 241.

The IMUs 22 and 23 arranged on the motor vehicle 9 acquire the data which allow the processing unit 4 to determine the position of the motor vehicle 9 at the instant t with respect to the fixed system, as shown in step 221.

The support sensor 29 is deactivated if the same selected route is carried out several times and reactivated only if a new or a different route is performed.

Alternatively, the support sensor 29 may be activated when necessary to re-align or reset the system 1.

Subsequently, in the step 202, the data acquired by the data acquisition units 2 and 3 are processed by the processing unit 4.

The processing unit 4 determines the relative positions between the driver, the motor vehicle 9 and the fixed system (the ground), as shown in step 212, and creates the images relating to the calculated positions, as shown in step 222.

In the next step 203 the data and the images processed by the processing unit 4 are stored on the storage unit 6, to be retrieved subsequently, as shown in the respective steps 213 and 223.

Subsequently, the process is divided into two different sub-processes 200' and 200".

The sub-process 200' relates to the projection and/or display of the data relating to the performances associated with the current lap of the user.

Whilst the sub-process 200" relates to the projection and/or display of the images relating to the performance associated with a previous lap of the user or a selected lap, even not performed by the user.

In the sub-process 200', in step 204, the data on the performance of the user in the current lap are sent to the projection device 5.

In this way, the user can view, phase 205, the data such as, for example, day, time, speed at instant t, humidity and the temperature relative to the route he/she is travelling along.

In the sub-process 200", in step 206, the data and the images I on the performance of the user in a previous selected lap, even not executed by the user, as in the case of a lap performed by a professional driver, are extracted from the storage unit 6 and sent to the projection device 5, in step 207.

In this way, the user can display, phase 208, the image I of the motor vehicle and of the user projected on the road surface SS.

More specifically, if the user in the current lap has a speed lower than the previously selected performance then the user will see in front of him/her the image I projected on the road surface SS.

Whilst if the user in the current lap has a speed greater than the previously selected performance then the user will not see in front of him/her the image I projected on the road surface SS.

In fact, in this case, the image I should be projected to a point which remains outside the field of vision of the user.

In this way, the user is immediately signalling with an improvement in performance compared with the previously selected performance.

The sequence of images I which are projected for each position adopted by the user may be relative to a previous lap, an imaginary lap, a lap performed by a professional driver or a selected lap.

The comparison with the previous performances may be made in relation to a lap performed by a professional driver whose performance is loaded and saved on the storage unit 6 and, if necessary, retrieved in step 206.

FIGS. 8 to 10 illustrate three different steps which show how the system 1 interacts with the user if the user turns his/her head.

That is to say, in the system 1 the image I is projected on the actual road surface SS in the exact point which corresponds to the exact position in which the performance which is projected has occurred in a previous lap.

If the user moves his/her head, for example by turning it to the left, as indicated by the arrow A in the drawings, the image I remains in the exact point which corresponds to the exact position in which the performance that is projected has occurred previously.

That means that if the user rotates his/her head a great deal, the image I can escape from the field of vision of the user.

This allows the user to keep a high degree of attention on the road surface SS during the training session.

The system according to the invention achieves the preset aims and brings important advantages.

A first advantage of the system 1 according to the invention is the possibility of detecting in real time the data on the performance of a user.

Another advantage is that of monitoring the training sessions of a user and favouring the constant learning thanks to a real-time correction of any errors.

Yet another advantage is that of providing a system suitable for training the driver based on the reproduction and the comparison with the performance of professional drivers with proven experience.

The invention claimed is:

1. A tracking and display system for tracking a position of a motor vehicle driven by a user with respect to a determined route and a position of said user with respect to said motor vehicle, said tracking system comprising:

a first data acquisition unit arranged on said motor vehicle and configured to instantly detect the position of said motor vehicle with respect to said determined route;

a second data acquisition unit attached to said user and configured to instantly detect the position of said user with respect to said motor vehicle and to said determined route;

a processing unit to generate an image of said position of said motor vehicle and of said position of said user;

a visual projection device connected to said processing unit and configured to be placed inside a helmet protecting said user, said visual projection device being configured to project onto a visor of said helmet said image generated by said processing unit superimposed on an actual road surface of said determined route displayed by said user, to represent instantly an actual position of said motor vehicle and said user assumed in a previous passage on the same section of said route.

2. The tracking and display system according to claim 1 wherein said first and said second data acquisition units comprise inertial sensors.

3. The tracking and display system according claim 1 wherein said first and said second data acquisition units comprise one Inertial Measurement Unit of Inertial Measurement.

4. The tracking and display system according to claim 1 wherein said visual projection device is configured to be permanently placed inside a protective helmet and configured to project said image over an entire area of the visor of said helmet.

5. The tracking and display system according to claim 1 comprising a storage unit of said image generated by said processing unit and configured to be displayed on said visual projection device.

6. The tracking and display system according to claim 1 wherein said second data acquisition unit comprises an Inertial Measurement Unit configured to attach itself firmly to the helmet of said user and being configured to generate an image of a position of said helmet.

7. The tracking and display system according to claim 1 wherein said second data acquisition unit comprises an Inertial Measurement Unit configured to be attached to a suit of said user, and being configured to generate an image of a position of said suit.

8. The tracking and display system according to claim 1 wherein said first and second data acquisition units comprise a support sensor of choice between GPS, magnetometer, odometer, gyrometer, laser interferometer, thermometer, barometer or a combination thereof.

9. The tracking and display system according to claim 1 wherein said first data acquisition unit placed on said motor vehicle comprises a first Inertial Measurement Unit configured to be placed in correspondence with a front portion of said motor vehicle, and a second Inertial Measurement Unit configured to be placed in correspondence with a rear portion of said motor vehicle.

10. The tracking and display system according to claim 1 wherein said first data acquisition unit placed on said motor vehicle comprises a third and a fourth Inertial Measurement Unit configured to be placed respectively on a right portion and on a left portion of said motor vehicle and a fifth Inertial Measurement Unit configured to be placed on a lower portion of said motor vehicle.

* * * * *